US007673330B2

(12) United States Patent
Bussard et al.

(10) Patent No.: US 7,673,330 B2

(45) Date of Patent: Mar. 2, 2010

(54) AD-HOC CREATION OF GROUP BASED ON CONTEXTUAL INFORMATION

(75) Inventors: Laurent Bussard, Verviers (BE); Alain Gefflaut, Herzogenrath (DE)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 11/326,278

(22) Filed: Jan. 5, 2006

(65) Prior Publication Data

US 2007/0168332 A1 Jul. 19, 2007

(51) Int. Cl.
*G06F 7/04* (2006.01)

(52) U.S. Cl. .............................. 726/7; 726/5; 713/153; 715/751

(58) Field of Classification Search ................ 709/204, 709/206, 225; 713/200, 151; 726/8, 19, 726/22

See application file for complete search history.

(56) References Cited

U.S. PATENT DOCUMENTS

| | | | | |
|---|---|---|---|---|
| 6,026,297 | A * | 2/2000 | Haartsen | 455/426.1 |
| 6,275,811 | B1 | 8/2001 | Ginn | 705/10 |
| 6,507,802 | B1 | 1/2003 | Payton et al. | 702/150 |
| 6,732,364 | B1 | 5/2004 | Bhaskaran et al. | 719/318 |
| 6,754,829 | B1 * | 6/2004 | Butt et al. | 726/8 |
| 6,826,612 | B1 * | 11/2004 | Bosloy et al. | 709/227 |
| 7,133,371 | B2 * | 11/2006 | Helm et al. | 370/270 |
| 7,184,790 | B2 * | 2/2007 | Dorenbosch et al. | 455/519 |
| 2002/0022453 | A1 * | 2/2002 | Balog et al. | 455/41 |
| 2002/0169679 | A1 * | 11/2002 | Neumayer | 705/26 |
| 2003/0023685 | A1 | 1/2003 | Cousins et al. | 709/205 |
| 2003/0126108 | A1 | 7/2003 | Martino et al. | 707/1 |
| 2003/0158897 | A1 * | 8/2003 | Ben-Natan et al. | 709/204 |

(Continued)

FOREIGN PATENT DOCUMENTS

WO WO 00/65486 A3 11/2000

(Continued)

OTHER PUBLICATIONS

Dersingh, A., et al., “Managing access control for presence-based services,” http://www.site.uottawa.ca/~rliscano/docs/CNSR2005_final.pdf, 7 pages.

(Continued)

*Primary Examiner*—William R Korzuch
*Assistant Examiner*—Michael R Vaughan
(74) *Attorney, Agent, or Firm*—Woodcock Washburn LLP

(57) ABSTRACT

Provided is ad-hoc creation of groups based on contextual information comprising. Two mechanisms are used to restrict valid members of a group. First, to make sure that devices are somehow related, devices provide contextual information that is compared to the contextual information provided by other devices willing to join the group. Only devices providing “similar” contextual information are accepted as possible candidates in the group. Second, to scope the group, a time window is used to limit the duration of the group creation. In other words, access to the group is reserved to the devices that can provide similar context information to existing member of the group in a defined time window. Security properties are ensured by enabling a visual check of the list of group participants. For instance, a member can verify that the displayed pictures indeed represent the attendees of an ongoing meeting.

20 Claims, 5 Drawing Sheets

U.S. PATENT DOCUMENTS

| | | | | |
|---|---|---|---|---|
| 2003/0233538 | A1 * | 12/2003 | Dutertre | 713/151 |
| 2004/0098448 | A1 * | 5/2004 | Fukushima et al. | 709/201 |
| 2004/0103280 | A1 * | 5/2004 | Balfanz et al. | 713/169 |
| 2004/0117444 | A1 * | 6/2004 | Goodman et al. | 709/204 |
| 2004/0203381 | A1 | 10/2004 | Cahn et al. | 455/41.2 |
| 2004/0230572 | A1 | 11/2004 | Omoigui | 707/3 |
| 2005/0097362 | A1 * | 5/2005 | Winget et al. | 713/201 |
| 2005/0143096 | A1 | 6/2005 | Boesch | 455/456.3 |
| 2005/0228853 | A1 | 10/2005 | Yamamura et al. | 709/200 |
| 2005/0266798 | A1 * | 12/2005 | Moloney et al. | 455/41.2 |
| 2006/0045267 | A1 * | 3/2006 | Moore et al. | 380/247 |
| 2006/0168446 | A1 * | 7/2006 | Ahonen et al. | 713/163 |
| 2007/0030824 | A1 * | 2/2007 | Ribaudo et al. | 370/328 |
| 2007/0123215 | A1 * | 5/2007 | Wang et al. | 455/411 |

FOREIGN PATENT DOCUMENTS

WO WO 01/25947 A1 4/2001

OTHER PUBLICATIONS

"Enabling ad-hoc secure peer-to-peer collaboration," http://www.dsd.lbl.gov/Collaboratories/Publications/dc2002-handout-7731_H9_SGI_CR.pdf, 2 pages.

Hong, X., et al., "Dynamic group support in LANMAR routing ad hoc networks," http://www.cs.ucla.edu/NRL/wireless/uploads/mwcn2002-hxy.pdf, 5 pages.

Kantor, M., et al., "Cassius: Designing dynamic subscription and awareness services," http://www.ics.uci.edu/~redmiles/publications/C042-KR02.pdf, 5 pages.

Ruths, D., et al., "Thyme: an ad-hoc group collaboration environment," http://www.cs.rice.edu/~ahae/isw-2004/slides/ruths.pdf, 11 pages.

Bottazzi, D. et al., "Enabling Context-Aware Group Collaboration in Manet's ", Autonomous Decentralized Systems, 2005, 310-318.

Capra, L., "Reasoning about Trust Groups to Coordinate Mobile ad-hoc Systems", Security and Privacy for Emerging Areas in Communication Networks, 2005, Workshop of the 1st International Conference, 141-152.

Dimitrakos, T. et al., "Contract Performance Assessment for Secure and Dynamic Virtual Collaborations", Enterprise Distributed Object Computing Conference, 2003, 7th IEEE International, 62-74.

* cited by examiner

Group Scoping
400

Security Check
405

Group Usage
410

Fig. 4

AD-HOC CREATION OF GROUP BASED ON CONTEXTUAL INFORMATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Due to the fast penetration of wireless technologies, collaborative applications enabling the ad-hoc and dynamic sharing of files or services between devices (for instance, between attendees of a meeting) are becoming more and more attractive for end users. Such collaborative applications are usually based on the dynamic creation of a group of devices. The dynamic formation of a group has to rely on some form of authentication mechanisms in order to control and limit the set of devices able to join the group. Today, the bootstrapping of a collaborative group generally requires some existing trust relationships between devices and involves complex user interactions in order to exchange credentials (e.g., username and password, X.509 certificates, etc.) through out-of-band channels (voice, memory stick, e-mail, etc.). X.509 is a specification for digital certificates published by the International Telecommunications Union—Telecommunication (ITU-T). These solutions are usually cumbersome and too complicated for non technical users.

Generally, dynamic creation of groups with guarantees in terms of confidentiality of exchanged data is important for a large number of collaborative applications ranging from exchange of business information during a meeting (Groove®, sharepoint®) to exchange of pictures with friends (shared folders, MSN Spaces®, etc.). A universal, user-friendly, and secure way to create groups is required. Most existing protocols for the creation of groups assume some pre-existing form of trust relationships between the possible members of the group (either though some form of registration or through some form of credential distribution such as a Public Key Infrastructure (PKI)). However these algorithms do not handle the case of ad-hoc group collaboration where members of a group do not have any existing trust relationships. Requiring these users to go through a phase of registration before being able to cooperate is both too complicated and too long in particular if the life time of the group is limited to the duration of a meeting. There is a substantial added value in the quick and secure creation of collaboration groups without requiring complicated user involvement.

In this regard, there is a need for processes and systems that address the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, ad-hoc creation of groups based on contextual information is provided. For several embodiments, a method for ad-hoc creation of groups based on contextual information involves providing contextual information and credential from a set of devices to a group server with a start group creation request. The group server checks, upon reception of the start group creation request by the server, whether the provided contextual information matches that of an existing group. A new group with a new group ID for the device, if no match is found by the server and the device is added to the list of potential members of an existing group if a match is found by the server. An acknowledgement is sent by the group server containing the group ID for every start group creation request received by the group. Admission to the group is closed by the group server upon reception of the first end group creation request by the group server.

Another characterization includes a method for ad-hoc creation of groups based on contextual information that involves providing contextual information by a first device, comparing the provided contextual information to contextual information provided by other devices and accepting the first device as a candidate for inclusion in a group based on the comparison of the provided contextual information by the first device with the contextual information provided by other devices. Also, the inclusion in the group of the first device is determined based on whether the first device can provide the context information to existing members of the group in a defined time window.

Other advantages and features of the invention are described below.

BRIEF DESCRIPTION OF THE DRAWINGS

Ad-hoc creation of groups based on contextual information is further described with reference to the accompanying drawings in which:

FIG. 4 illustrates, as an example, the phases involved in ad-hoc creation and usage of groups based on contextual information.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
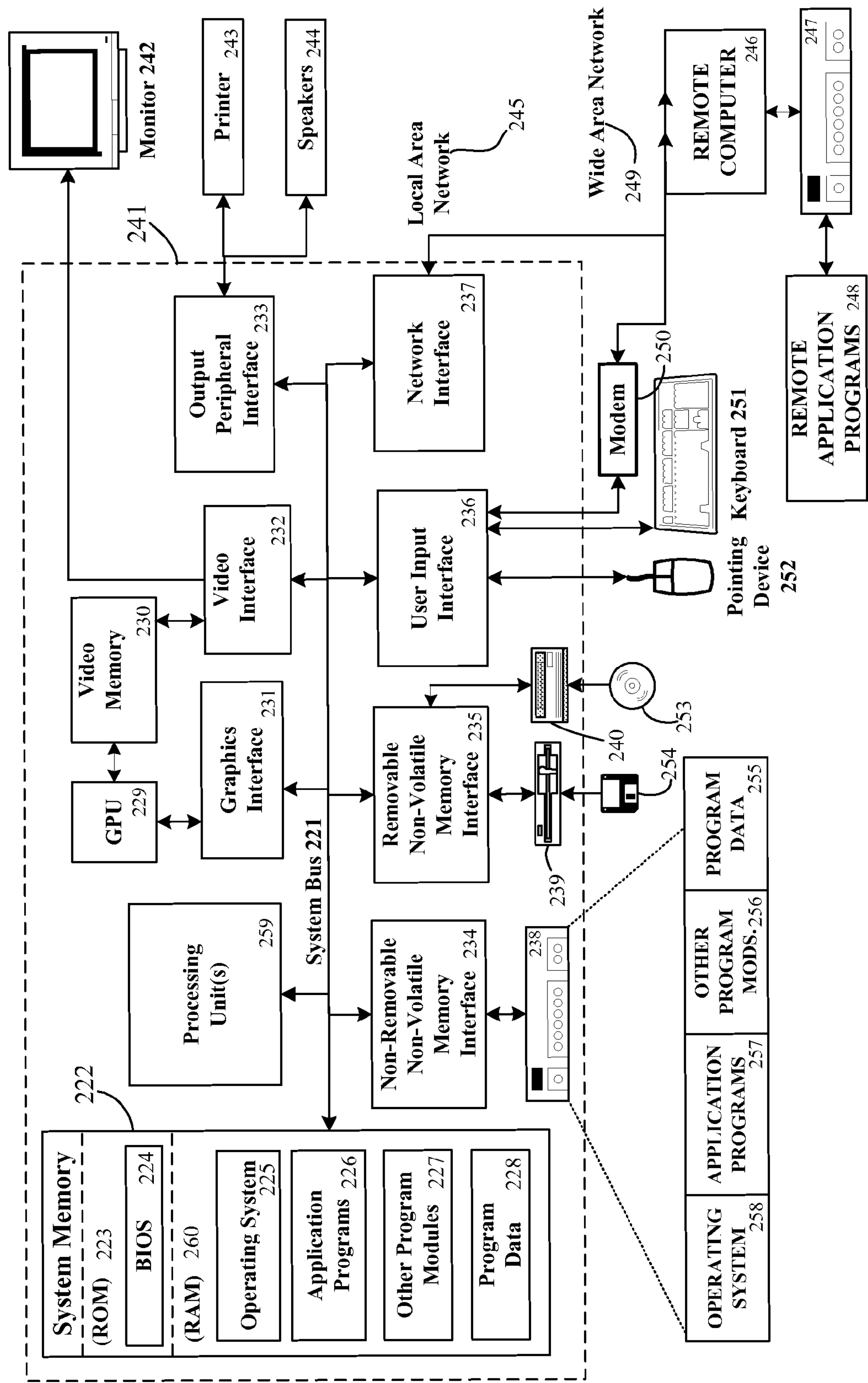
FIG. 1 is a block diagram representing an exemplary computing device suitable for use in conjunction with implementing the processes of ad-hoc creation of groups based on contextual information.

Referring next to FIG. 1, shown is a block diagram representing an exemplary computing device suitable for use in conjunction with implementing the processes described above. For example, the computer executable instructions that carry out the processes and methods for ad-hoc creation of groups based on contextual information may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console or a cell phone may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
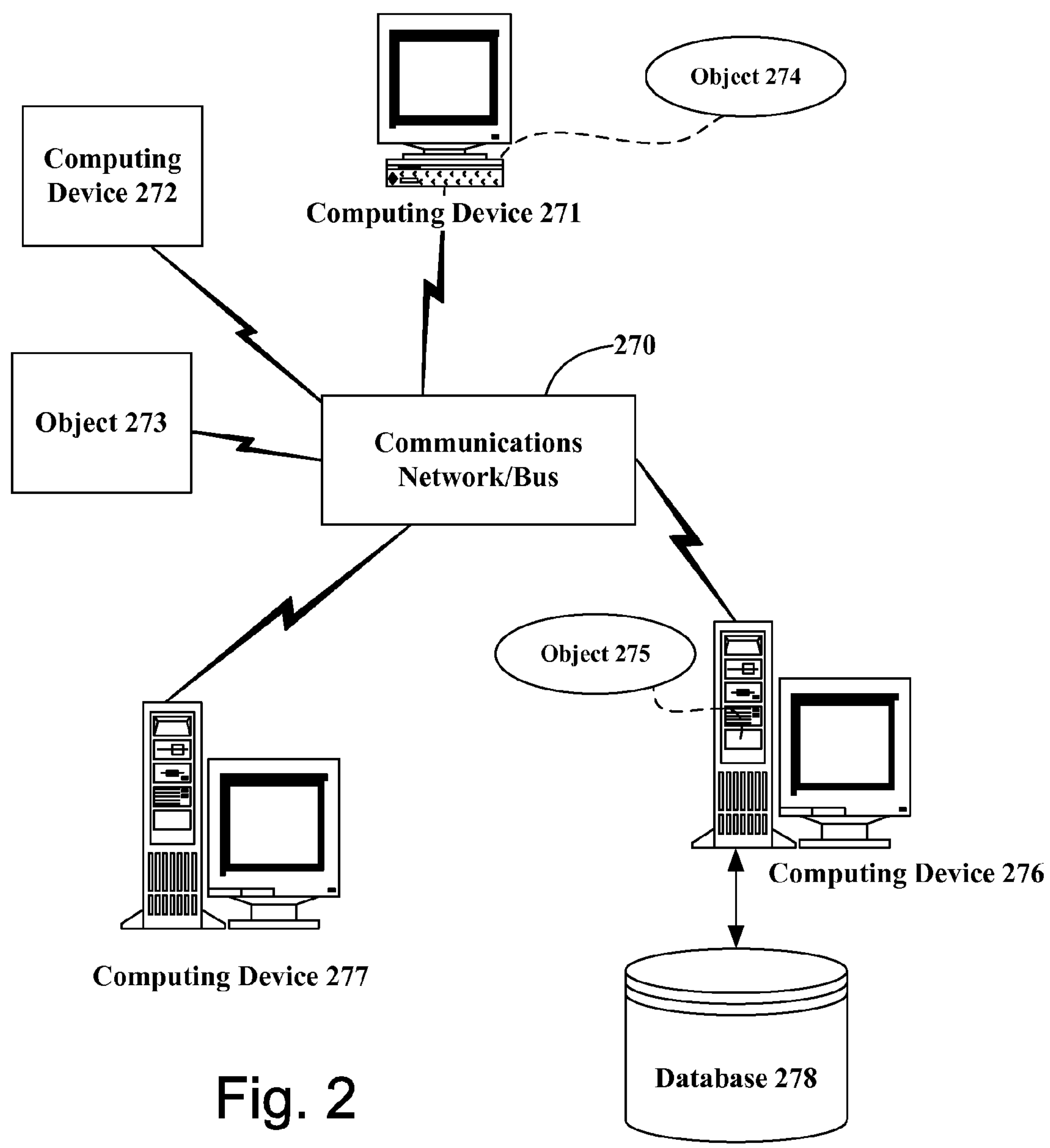
FIG. 2 illustrates an exemplary networked computing environment in which many computerized processes may be implemented to perform ad-hoc creation of groups based on contextual information.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing ad-hoc creation of groups based on contextual information. One of ordinary skill in the art can appreciate that networks can connect any computer or other client or server device, or in a distributed computing environment. Computing devices represent user devices as well as servers. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the invention should not be limited to any single embodiment, but rather should be construed in breadth and scope in accordance with the appended claims.

Ad-hoc creation of groups based on contextual information provides a mechanism that drastically simplifies the bootstrapping of a group: users only have to click two buttons to be part of the group. Two mechanisms are used to restrict valid members of a group. First to make sure that devices are somehow related, devices have to provide contextual information that is compared to the contextual information provided by other devices willing to join the group. Only devices providing "similar" contextual information are accepted as possible candidates in the group. Second, to scope the group, a time window is used to limit the duration of the group creation. In other words, access to the group is reserved to the devices that can provide similar context information to existing member of the group, in a well defined time window.

At the end of the interaction, each group member gets the list of group members and credentials (e.g. public keys) that can be used for setting access control rules or for establishing secure channels. In order to protect the group against attacks, the list of group members is displayed as a list of names and/or photos to each member of the group in order to detect intruders.

The fact that context information is known and a range in time is enough to access a group. The members of a group are scoped by their ability to provide contextual info that is somehow related. Also, the formation of groups is allowed without the need for pre-existing trust relationships. Once the group exists, credentials can be used to enable secure communications or access control between members of the group.

In ad-hoc creation of groups based on contextual information there is a central, known service for creating groups (referred as "group server" herein). The group server is accessible by each attendee. In an ad-hoc network configuration, the group server may be local or remote and all users wanting to join the group must have access to the group server. Note that the group server may be a dedicated machine or could be impersonated by one of the devices trying to create the group. Also, all users have a client application used to create/join groups. In ad-hoc creation of the groups an implementation of a protocol to create groups and credentials (e.g. public keys or self-signed X.509 certificates) is also used.

Figure 3:
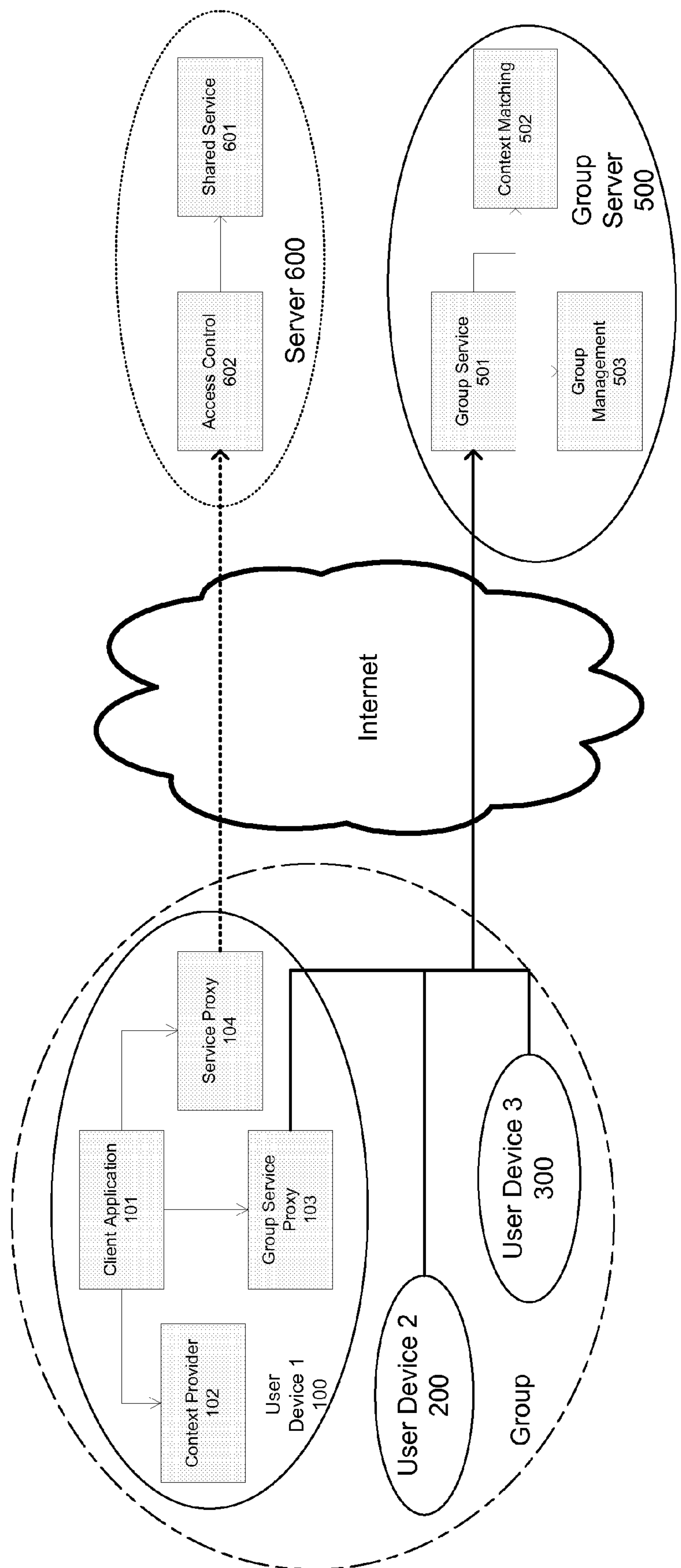
FIG. 3 illustrates, as an example, the different modules involved in an architecture of a system for ad-hoc creation of groups based on contextual information.

Referring to FIG. 3, shown as an example are the different modules involved in an architecture of a system for ad-hoc creation of groups based on contextual information. N users with their devices 100 200 300 are using the same Group server 500 and one or more shared applications/services 601 on server 600.

The client application 101 relies on the following blocks:

The Context Provider 102 which provides context information common to every member of the group and reflects the fact that the users are somehow close to each other. In one example, the list of available Institute of Electrical and Electronics Engineers (IEEE) 802.11 access point's machine access code (MAC) addresses is sufficient.

Figure 5:
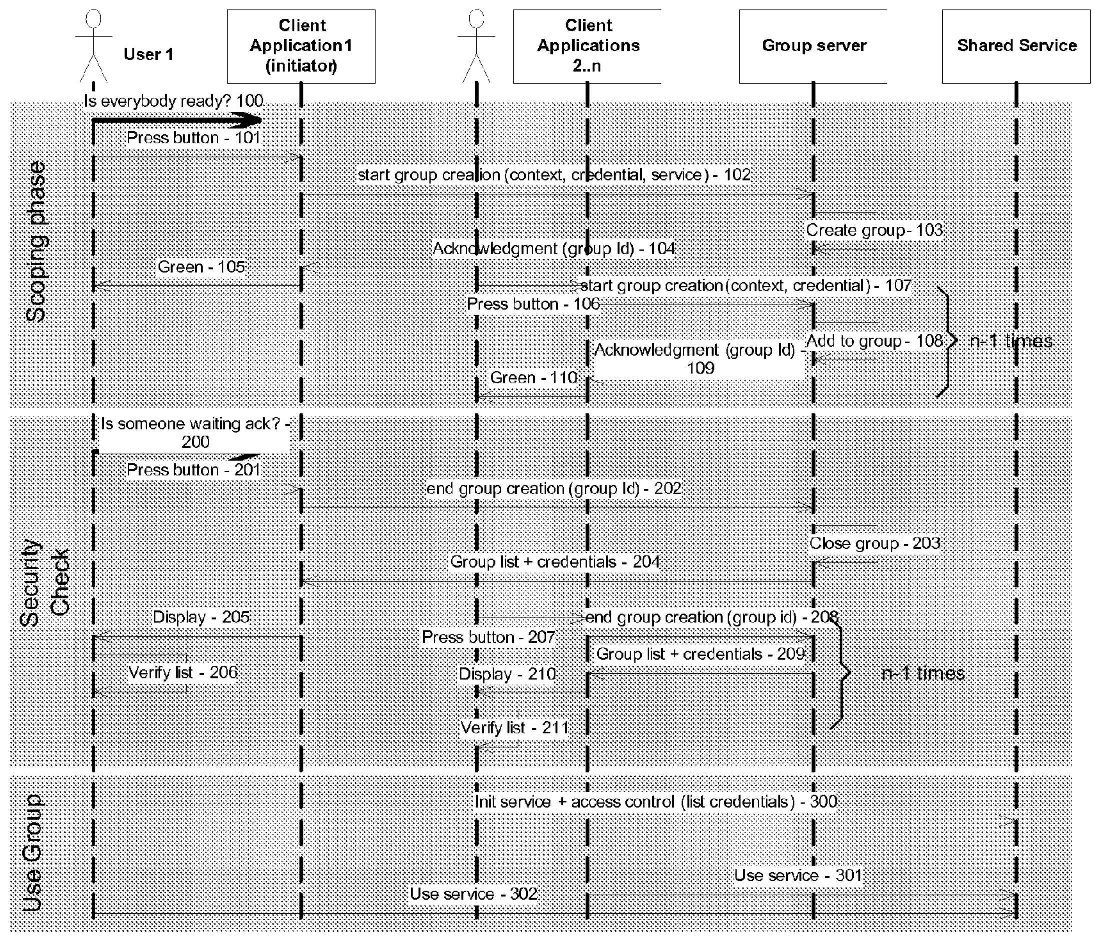
FIG. 5 illustrates, as an example, a sequence diagram providing an overview of the interactions involved in the protocol of ad-hoc creation of groups based on contextual information.

The Group Service Proxy 103 implements the client part of the protocol described in FIG. 5. It could be the proxy to access a Web Service offered by the Group Server.

The Service Proxy 104 will highly depend on the application using the group.

The Group Service 501 relies on the following blocks:

A Context Matching module 502 that compares context provided by users in order to assign them to a given group.

A Group Management module 503 that keeps the list of open groups. Information regarding a group is stored for a short time by the group server. The state is erased as soon as all members got the list of credentials or after some timeout.

The Shared Service 601 relies on an Access Control module 602 that is configured by its owner (generally a member of the group). The access control only allows members of the group to access the service based on their credentials (e.g., the request signed with the private key of a group member).

Figure 4:
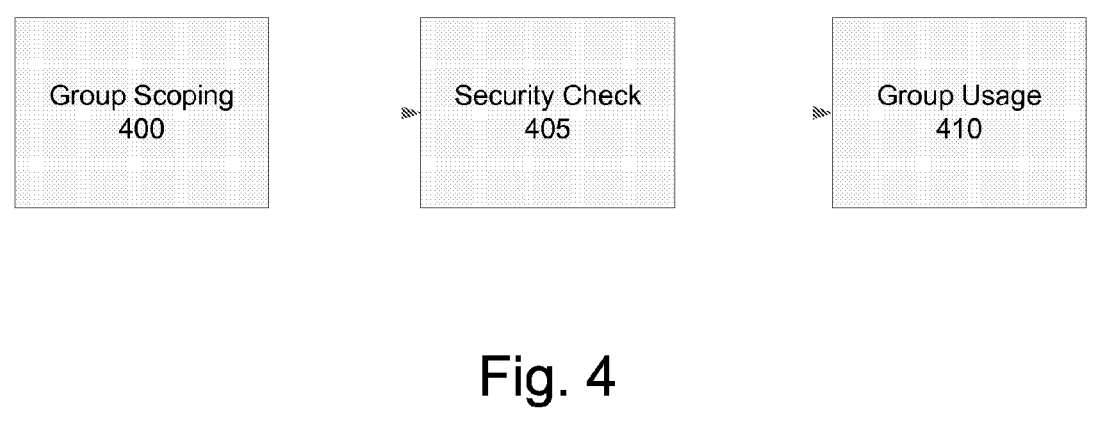

Referring next to FIG. 4, shown as an example are the phases involved in ad-hoc creation and usage of groups based on contextual information. In the scoping phase 400, all potential members send their contextual and credential information to the group server. Upon reception of a start group creation request, the group server will check whether the provided contextual information "matches" an existing group. A group is a set of credentials (e.g. public keys and names) of members sharing a similar context. If no group can be found, a new group is created with a new group identifier (ID). If a group matches, the requester is simply added to the list of potential members of the group with its associated credential information. For every start group creation request, the group server sends an acknowledgement containing the group ID. Upon reception of the first end group creation request, the group server will close the admission to the group. For every end group creation request, the group server will send the list of members and associated credentials to the requester. The scoping phase terminates when the last of the potential members receives the complete list of potential members.

In the security check phase 405, all potential members review the provided list of members to make sure that no intruder (due to conflict with another group or deliberate attack) has joined the group. In case one or several intruders have been detected, the members should restart a new group creation. If no problem is detected, the credential information can be used to define access to a shared service only available to the members of the group. In the group usage phase 410, the created group can be used for different purposes. For example, a usage could be to get access to a shared service such as a file sharing service.

Referring next to FIG. 5, shown as an example is a sequence diagram providing an overview of the interactions involved in the protocol of ad-hoc creation of groups based on contextual information. In the present example, N persons are together in a meeting room and want to create a group (2 users are depicted in FIG. 5).

Phase 1: Group Scoping

1. The initiator, depicted as user 1 of FIG. 5 (e.g., the meeting leader), checks that everybody is ready to create the group 100.

2. Each user clicks the button "meeting" 101 and 106. Each client application sends a "start group creation" request to the group server 102 and 107. Associated to this request is the following information.

a. The current context information as seen by the user device (for example a list of 802.11 access points).

b. User credential information, (i.e. self-signed credential containing a public-key and attributes like name, photo). The key material and the credential can be generated at this time.

c. Optionally, the identity of the requested shared service.

3.The group server opens a new group 103 if the provided context does not match any currently opened group context. A random group ID is created to uniquely identify the group. If a match was found, the group server associates the requestor to the opened group based on the provided context information and request time. This is indicated in FIG. 5, for example, by add to group 108 n−1 times in response to start group creation request(s) 107 sent by devices executing client applications 2 through n. If there are n members of a group, in response to the first start group creation request 102 received from a device executing client application 1, which is referred to as the initiator, the group server creates the group 103 with the context provided by the initiator while the response to the subsequently received n−1 requests to start group creation 107 from devices having the same context, the group server adds the n−1 requestors to the previously created group 108.

4. Each client application receives an acknowledgement with the associated group ID 104 and 109.

5. The group creation acknowledgment is reflected to the user by a visual flag turning green 105 and 110.

Phase 2: Security Check

6. The initiator checks that everybody got an acknowledgement 200 before closing the group. This is performed by asking all participants if their flag has been changed to green.

7. Each user clicks a second time the button "meeting" 201 207 to inform that the group is completed. An "end group creation" request containing the group ID is sent to the group server by the client applications 202 208.

8. The group server closes the group upon reception of the first "end group creation message" with the matching group ID 203.

9. For each client application, the group server returns the list of group members and their associated credentials 204 209.

10. In order to avoid attacks based on spoofed context, each user displays the list of members (name, photo, etc.) 205 210.

11. Thanks to the displayed list, users can perform a visual verification and check that the group does not contain any intruder (ex: only contains people in the meeting room) 206 211.

Phase 3: Group Usage

The created group can be used for different purposes. A simple usage could be to get access to a shared service such as a file sharing service.

12. One member of the group uses the list of credentials to configure the access to the shared service 300.

13. Access to the shared service is restricted to the current members of the group 301 and 302.

14. Once the meeting is over, the group member who configured the access to the shared service deletes the group access configuration.

Properties of the protocol are provided below:

- Users only have to click twice on a button and do not have to enter a secret.
- Members of group are scoped based on context (e,g, the list of visible WiFi access points) and time (short time window between start group creation and end group creation requests: few seconds).
- Security is based on a control using the information provided by users (e.g., visual feedback if photo provided, list of names, etc.)
  - An intruder tampering with context (by faking or recording the context information) will be visible in the list.
  - An intruder tampering with context and at the same time impersonating a legitimate user (i.e. same name but different keys) will be detected as well: the attacker cannot suppress the legitimate user, which will thus appear twice.

There is no security requirement regarding the context information provided by members of a group. Context information may be provided by the Network Interfaces of the devices 237 and/or other Input Interfaces 236 to which external sensors might be connected. In a simple embodiment of this invention, the list of MAC addresses of the surrounding 802.11 access points or Global Positioning system (GPS) coordinates could be used as context information. Also, there is no security or synchronization requirement regarding the group creation time window since only the request arrival time on the group server is used.

The group server does not have to be trusted by partners since it is only used in the scoping phase but not in the security check phase. It is necessary to ensure the confidentiality and integrity of message exchanged between the group server and each user. Secure Socket Layer (SSL) or any available secure channel mechanism could be used for this purpose assuming that the public key of the group server is preinstalled in the client application.

Also, members of the group trust each other and only want to prevent attacks from external parties able to tamper with their context and/or impersonate legitimate members. In this case, the credential of a user can be self-signed and only containing a public key with a set of associated attributes for the user (name, photo, etc.). For instance, a self-signed X.509 certificate could be used. Such keys could be generated when joining the group and do not require a public key infrastructure (PKI).

Using self-signed credentials makes it possible for a malicious but authorized member to share its private key with other entities. Using a public key infrastructure (e.g. relying on electronic identity card) would prohibit such an attack since people do not want to share a valuable private key or cannot share if it is protected by a smart card.

Having one central group server is not scalable. It is necessary to define mechanisms to distribute requests to different group servers depending on the context. Having group servers available in the local network used by the meeting attendees and a discovery mechanism is also an option. Also, another ad-hoc scenario is defined where one of the group members is used as the group server.

Group servers are known and trusted. However, when group servers are part of the local infrastructure (e.g. offered by the WiFi access point), it is no more possible to assume that they are trusted. When the infrastructure is managed by a trusted party, a public key infrastructure (PKI) could be used. Otherwise, each client can first verify that there is no intruder by displaying the list, and next verify that their credential is part of the list and that everybody get the same list. The latter can be ensured when starting a shared service that no more involves the "group server."

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for ad-hoc creation of groups based on contextual information about devices provided within a time window to limit a duration of group creation comprising:

providing, by a first device, contextual information about the first device and credentials of a user of the first device;

providing, by each of at least one other device, contextual information about each of the at least one other device and credentials of each user of each of the at least one other device;

comparing the similarity of contextual information about the first device to the contextual information about each of the at least one other device;

accepting the user of the first device as a candidate for membership in a group if the comparison indicates similarity; and determining membership in the group of the candidate based on whether the first device provided the contextual information about the first device in the time window, wherein the time window applies concurrently to all users and its expiration closes membership in the group.

2. The method of claim 1 further comprising:

providing each group member a list of group members and user credentials operable for setting access control rules or for establishing secure channels.

3. The method of claim 2 wherein the credentials are public keys.

4. The method of claim 2 wherein the list of group members is displayed as a list of names or photos of each user of each member of the group in order to detect intruders.

5. The method of claim 2 wherein accepting the user of the first device as a candidate for inclusion in a group is done without pre-existing trust relationships between devices and wherein the providing the contextual information is triggered by the user of the first device interacting with a graphical user interface using a clickable input device by clicking twice to be part of the group.

6. The method of claim 5 further comprising:

providing the contextual information of the first device and credential information of the user of the first device to a group server with a start group creation request;

checking, upon reception of the start group creation request by the server, whether the contextual information of the first device matches that of an existing group;

creating a new group with a new group ID, if no match is found by the server; and adding the user of the first device to a list of potential members of an existing group if a match of the existing group is found by the server.

7. A computer readable storage medium having stored thereon computer executable instructions for performing ad-hoc creation of groups based on contextual information about devices provided within a time window to limit a duration of group creation by:

providing, by a first device, contextual information about the first device and credentials of a user of the first device;

providing, by each of at least one other device, contextual information about each of the at least one other device and credentials of each user of each of the at least one other device;

comparing the similarity of contextual information about the first device to the contextual information about each of the at least one other device;

accepting the user of the first device as a candidate for membership in a group if the comparison indicates similarity; and determining membership in the group of the candidate based on whether the first device provided the contextual information about the first device the time window, wherein the time window applies concurrently to all users and its expiration closes membership in the group.

8. The computer readable storage medium of claim 7 storing computer executable instructions further for providing each group member a list of group members and user credentials operable for setting access control rules or for establishing secure channels.

9. The computer readable storage medium of claim 7, wherein the credentials are public keys.

10. The computer readable storage medium of claim 7, wherein the list of group members is displayed as a list of names or photos of each user of each member of the group in order to detect intruders.

11. The computer readable storage medium of claim 7, wherein accepting the user of the first device as a candidate for inclusion in a group is done without pre-existing trust relationships between devices and wherein the providing the contextual information is triggered by the user of the first device interacting with a graphical user interface using a clickable input device by clicking twice to be part of the group.

12. The computer readable storage medium of claim 7 storing computer executable instructions further for:

providing the contextual information of the first device and credential information of the user of the first device to a group server with a start group creation request;

checking, upon reception of the start group creation request by the server, whether the contextual information of the first device matches that of an existing group;

creating a new group with a new group ID, if no match is found by the server; and adding the user of the first device to a list of potential members of an existing group if a match of the existing group is found by the server.

13. A system for ad-hoc creation of groups based on contextual information about devices provided within a time window to limit a duration of group creation comprising:

means for providing, by a first device, contextual information about the first device and credentials of a user of the first device;

means for providing, by each of at least one other device, contextual information about each of the at least one other device and credentials of each user of each of the at least one other device;

means for comparing the similarity of contextual information about the first device to the contextual information about each of the at least one other device;

means for accepting the user of the first device as a candidate for membership in a group if the comparison indicates similarity; and means for determining membership in the group of the candidate based on whether the first device provided the contextual information about the first device in the time window, wherein the time window applies concurrently to all users and its expiration closes membership in the group.

14. The system of claim 13 further comprising:

means for providing each group member a list of group members and user credentials operable for setting access control rules or for establishing secure channels.

15. The system of claim 14 wherein the credentials are public keys.

16. The system of claim 14 wherein the list of group members is displayed as a list of names or photos of each user of each member of the group in order to detect intruders.

17. The system of claim 14 wherein the means for accepting the user of the first device as a candidate for inclusion in a group comprises means for accepting without pre-existing trust relationships between devices.

18. The system of claim 17 further comprising:

means for providing the contextual information of the first device and credential information of the user of the first device to a group server with a start group creation request;

means for checking, upon reception of the start group creation request by the server, whether the contextual information of the first device matches that of an existing group;

means for creating a new group with a new group ID, if no match is found by the server; and means for adding the user of the first device to a list of potential members of an existing group if a match of the existing group is found by the server.

19. A method for ad-hoc creation of groups based on contextual information about devices provided within a time window to limit a duration of group creation comprising:

providing from a first device to a group server a start group creation request with contextual information about the first device and credential information about a user of the first device;

checking, upon reception of the start group creation request by the server, whether the contextual information of the first device matches contextual information of an existing group;

creating a new group with a new group ID for the first device, if no match is found by the server;

adding the user of the first device to the list of potential members of an existing group if a match of the existing group is found by the server;

sending an acknowledgement by the group server containing the group ID for every start group creation request received by the group server from a device;

providing from at least one device to the group server at least one end group creation request; and closing the time window for admission to the group by the group server upon reception of the at least one end group creation request by the group server, wherein the time window applies concurrently to all users and its expiration closes membership in the group.

20. A computer readable storage medium storing computer executable instructions for performing ad-hoc creation of groups based on contextual information about devices provided within a time window to limit a duration of group creation by:

providing from a first device to a group server a start group creation request with contextual information about the first device and credential information about a user of the first device;

checking, upon reception of the start group creation request by the server, whether the contextual information of the first device matches contextual information of an existing group;

creating a new group with a new group ID for the first device, if no match is found by the server;

adding the user of the first device to the list of potential members of an existing group if a match of the existing group is found by the server;

sending an acknowledgement by the group server containing the group ID for every start group creation request received by the group server from a device;

providing from at least one device to the group server at least one end group creation request; and closing the time window for admission to the group by the group server upon reception of the at least one end group creation request by the group server, wherein the time window applies concurrently to all users and its expiration closes membership in the group.

* * * * *